United States Patent [19]

Suzuki

[11] Patent Number: 4,875,860

[45] Date of Patent: Oct. 24, 1989

[54] ELECTRICAL CONNECTING APPARATUS FOR STEERING WHEEL AND STEERING COLUMN

[75] Inventor: Masaru Suzuki, Aichi, Japan

[73] Assignee: Kabushiki Kaisha Tokai Rika Denki Seisakusho, Aichi, Japan

[21] Appl. No.: 266,579

[22] Filed: Nov. 3, 1988

[30] Foreign Application Priority Data

Nov. 9, 1987 [JP] Japan ............................ 62-170918[U]

[51] Int. Cl.$^4$ ........................................... H01R 35/04
[52] U.S. Cl. ..................................................... 439/15
[58] Field of Search ....................... 439/11, 13, 15, 164

[56] References Cited

U.S. PATENT DOCUMENTS 4,422,699 12/1983 Sakurai et al.
4,451,105  5/1984 Sakurai.
4,722,690  2/1988 Priede ..................................... 439/15
4,789,342 12/1988 Shitanoki .............................. 439/15

FOREIGN PATENT DOCUMENTS 53-118243 9/1978 Japan.
57-66045  4/1982 Japan.

Primary Examiner—Gary F. Paumen
Attorney, Agent, or Firm—Birch, Stewart, Kolasch & Birch

[57] ABSTRACT

An apparatus for connecting two wirings on the sides of a steering wheel and a steering column includes a case assembly having a stationary casing and a rotor with a lid for the casing, and a coil-shaped cable member accommodated in the case assembly. The casing has an internal gear at its upper section, the internal gear being arranged to cross a rotational axis of the rotor at right angles. A ring-shaped gear which is engaged with the internal gear is rotatably arranged inside the internal gear as well as on the lid. Both gears are so designed that the number of teeth on the gear is smaller than that of the internal gear. A biasing mechanism for biasing the gear to the internal gear is provided for the lid. Further, an indication scale is arranged on a front surface of the gear for cooperating with a mating mark which is provided for the casing or the lid.

When the rotor turns in any one direction, the biasing mechanism moves in the same direction while it biases the gear to the internal gear. There is a discrepancy in the number of gear teeth between the two. Consequently, the gear moves along its circumferential direction a minimal amount for every one turn of the rotor.

5 Claims, 3 Drawing Sheets

ELECTRICAL CONNECTING APPARATUS FOR STEERING WHEEL AND STEERING COLUMN

BACKGROUND OF THE INVENTION

1. Field of the invention

The present invention generally relates to an apparatus for connecting wiring on a steering wheel to a wiring on a steering column for use in an automotive vehicle, and especially relates to an apparatus which is capable of indicating a number of turns of the steering wheel.

2. Description of the related art

Conventionally, there are various types of the above-mentioned apparatus in practical use. Generally, such an apparatus has a coil-shaped cable member of a flexible material, in which a plurality of electrically conductive wire rods are arranged. These types of apparatuses have been disclosed, for example, in Japanese Laid-open Utility Model Publication No. 53-118243 (1978) and Japanese Laid-open Patent Publication No. 57-66045 (1982).

In the conventional type of apparatus as described above, the cable member is accommodated in a case which is normally located under a steering wheel and comprises a stationary casing fitted to the side of a steering column and a rotatable case member fitted to the side of the steering wheel. One end of the cable member is fixed at the stationary casing, and the other end is fixed at the rotatable case member. When assembling the apparatus and mounting it between the steering wheel and column, it is necessary to maintain a neutral condition of the coil-shaped cable member, since the apparatus is being mounted thereto.

In an apparatus having the above-mentioned structure, however, there is a disadvantage that there is no way to visually confirm whether or not the coil-shaped cable member returns to its neutral shape when the steering wheel is turned to its neutral position, since it is normally impossible to look at the inside of the case from its outside. That is, there is no way to confirm visually whether or not a neutral position of the steering wheel is in conformity with that of the coil-shaped cable member in the case. In addition to the above, even though it is possible to look at the interior of the case through a window or a transparent wall of the case, it is difficult to confirm the neutral condition of the coil-shaped cable member without any helpful means because of a large number of coils. Therefore, even if the apparatus is initially arranged with a correct relationship between the two, it is difficult to mount the apparatus with the correct relationship, i.e., under the condition of keeping the coil-shaped cable member neutral, to its place in the automotive vehicle again after the apparatus is dismounted for any reason.

If the apparatus is connected to the steering wheel and there is no adjustment between the two such that the cable member remains biased, there is a possibility that the electrical connection between the steering wheel side and the steering column side may be interrupted with the rotation of the steering wheel.

SUMMARY OF THE INVENTION

Accordingly, an essential object of the present invention is to provide an improved apparatus for making an electrical connection between a steering wheel side and a steering column side to easily obtain interfacing between the steering system and the coil-shaped cable member, which can overcome such a disadvantage as described above and is capable of being visually confirmed from the outside of the apparatus whether or not the coiling state of a coil-shaped cable member in a case is in its neutral position.

In accomplishing this and other objects, according to one preferred embodiment of the present invention, there is provided an improved apparatus for the electrical connection between the two, which comprises a case assembly including a stationary casing fixed on the side of the steering column and a rotor member rotatably disposed in the casing, the rotor member being rotatable together with the steering wheel, and a coil-shaped cable member accommodated in a spacing formed by both the casing and the rotor member of the case assembly, wherein the cable member is of a flexible material and is coiled to follow the movement of the steering wheel, one end of the cable member being fitted to the side of the casing and the other end being fitted to the side of the rotor member, respectively. The apparatus further comprises an internal gear fixed to the casing concentrically with the rotor member; a ring-shaped gear member having a plurality of gear teeth on its outer periphery, the number of teeth being less than that of the internal gear and which is engaged with the internal gear, the ring-shaped gear member being arranged inside the internal gear and free from the casing and the rotor member; bias means for biasing the ring-shaped gear member to the internal gear so that the gear may engage the internal gear, the bias means being fitted to the rotor member; and indication, means arranged on a surface of the ring-shaped gear member for a cooperating with a mating mark which is provided for at least one of the casing and the rotor member.

According to one embodiment, the bias means comprises a contact segment which is movably supported in the rotor member so as to move along a radial direction of the rotor member and a spring member for urging the contact segment so that the contact segment is in contact with a peripheral surface of the inside of the ring-shaped gear member.

Further, according to another embodiment, the bias means comprises a pin member fixed on a front surface of the rotor member so that the pin member is in contact with a peripheral surface of the inside of the ring-shaped gear member corresponding to an engaged portion of both gears when both gears are engaged with each other.

Still further, according to another embodiment, the bias means comprises a ring-shaped plate stationarily arranged on the rotor member and a pin member arranged on a rear surface of the ring-shaped plate so that the pin member is in contact with a peripheral surface of the inside of the ring-shaped gear member corresponding to an engaged portion of both gears when both gears are engaged with each other.

In accordance with the present invention, the gear of the ring-shaped gear member is engaged with the internal gear by means of the bias means. Accordingly, when the steering wheel is turned in any direction, the rotor member turns in the same direction, so that the bias means, such as the contact segment urged outward in the radial direction by the spring or the pin member stationarily arranged in the rotor member, moves with the rotor member as well. Then, the engaged portion of both gears shifts with the movement of the location of the bias means. In addition, the number of gear teeth of the ring-shaped gear member is less than that of the internal gear, so that the ring-shaped gear member may shift little by little every one turn of the steering wheel and its shifting amount is dependent upon the difference in the number of gear teeth between both gears. On the other hand, there is provided a mating mark for either of the casing or the rotor member and the ring-shaped gear member provided with indication means, for example a scale corresponding to the ring-shaped gear member. Therefore, the discrepancy between the two gives a degree of bias for the coil-shaped cable member in relation to its initial state.

Accordingly, the neutral position of the rotor member which corresponds to the neutral state of the coil-shaped cable member can be determined through the indication means and the mating mark. In other words, the coiling state of the cable member in the case assembly can be visually confirmed from the outside of the case assembly. That means mis-alignment between the steering wheel and the apparatus can be easily prevented on the occasion of its mounting, so that the electrical connection between the steering wheel side and the steering column side is not interrupted.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
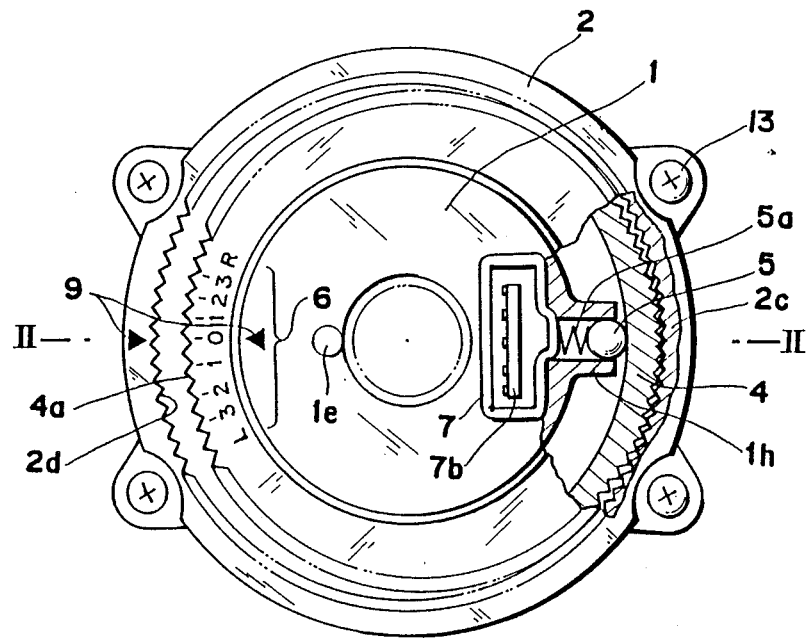
FIG. 1 is a front elevational view, partly in cross section, of an apparatus for electrical connection between both sides of a steering wheel and a steering column, according to a first embodiment of the present invention.

Before the description of the present invention proceeds, it is to be noted that like parts are designated by like reference numerals and symbols throughout the several views of the accompanying drawings.

Figure 2:
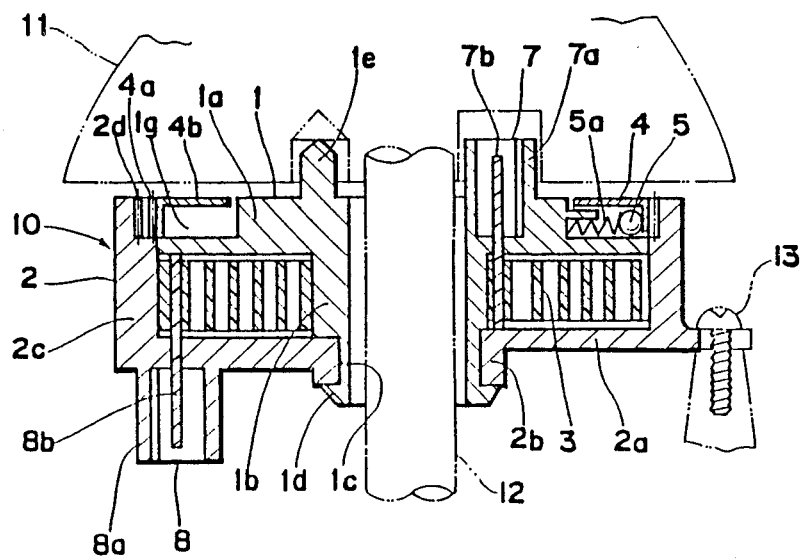
FIG. 2 is a sectional view taken along line II—II of FIG. 1.

Referring now to the drawings of FIGS. 1 and 2, there are, respectively, shown an apparatus for connecting wiring (not shown) on the side of a steering wheel 11 to wiring (not shown) on the side of a steering column, according to a first embodiment of the present invention. In FIGS. 1 and 2 reference numeral 3 designates a ribbon-type cable member which is formed as a coil. The coil-shaped cable member 3 is accommodated in a case assembly 10 which comprises a lid-shaped rotor member 1 and a stationary casing 2, the case assembly 10 being formed like a hollow doughnut by the two member 1, 2. A steering shaft penetrates a center portion of the case assembly 10.

The above-mentioned rotor member 1 has a lid shape by which the casing 2 is covered as well as a take-up hollow shaft for the coil-shaped cable member. That is, the rotor member 1 comprises a disk-shaped lid body $1a$ disposed rotatably in an upper portion of the inside of the stationary casing 2 and a boss member $1b$ formed at the central portion of the lid body $1a$. These members $1a$, $1b$ are formed as one body. Further, a pin member $1e$ projecting toward a steering wheel 11 and a shell $7a$ surrounding a wiring board $7b$ of a connector are formed on the lid body $1a$ as one body. This connector is for a cable connector on the side of the steering wheel 11. The boss member $1b$ mentioned above as a take-up shaft is so designed that the steering shaft 12 may penetrates at the center portion thereof. Further, there are provided a circumferential groove $1c$ and a plurality of engaging claws $1d$ at a lower end portion of the boss member $1b$, the engaging claws $1d$ being arranged adjacent to the groove $1c$ at the end edge portion thereof and the groove $1c$ being formed behind the claws $1d$. Furthermore, the lid body $1a$ is so formed that a peripheral edge portion of the lid body $1a$ becomes a step lower than the others.

It is to be noted that the rotor member 1 rotates together with the steering wheel 11 since the pin member $1e$ is engaged with a hole formed in a member of the steering wheel side when the steering wheel 11 is mounted to its predetermined position.

Meanwhile, the above-mentioned stationary casing 2 has a U-shaped section and comprises a disc-shaped bottom wall $2a$, a boss $2b$ arranged on the outer surface of the bottom wall $2a$ for being engaged with the circumferential groove $1c$ of the boss member $1b$, and a circumferential side wall $2c$ standing on the peripheral edge portion of the bottom wall $2a$. These members $2a$, $2b$ and $2c$ are formed as one body. The aboved-mentioned boss $2b$ has a through-hole in its center portion, into which the top end portion of the boss member $1b$ of the lid-shaped rotor member 1 is inserted, so that the boss $2b$ may be engaged with the groove $1c$. A plurality of claws $1d$ of the rotor member 1 hook in the end surface of the boss $2b$, so that the rotor member 1 may be held in the casing 2. Further, there is provided a shell $8a$ surrounding a wiring board $8b$ of a connector on the outer surface of the bottom wall $2a$. This connector is for a cable connector on the side of the steering column. The stationary casing 2 is fixed to a member on the side of the steering column with screws 13. In addition to the above, the upper portion of the side wall $2c$ of the casing 2 is provided with an internal gear $2d$. That is, gear teeth are formed on the inner surface of the side wall $2c$ confronting the step-wise peripheral surface of the lid body $1a$ and the internal gear $2d$ is formed at the upper portion of the casing 2.

The coil-shaped cable member 3 is disposed in the case assembly 10. That is, the cable member 3 is accommodated in the spacing formed in cooperation with the lid-shaped rotor member 1 and the casing 2. An internal end portion of the cable member 3 is fitted to the printed wiring board $7b$ which is disposed in the case assembly 10 so as to protrude into the shell $7a$ on the lid body $1a$. An external end portion is fitted to the other board $8b$ which is disposed in the case assembly 10 in a manner similar to the above. Connection between wirings on the steering wheel side and the steering column side is as follows. Conductive wires (not shown) in the cable member 3 are electrically connected with the printed wiring boards 7b, 8b at each of its ends, respectively. Therefore, the wirings on the steering wheel side are connected to one of the wiring boards 7b through the connector at a connecting terminal 7, and the wirings on the steering column side are connected to the other board 8b through the connector at a connecting terminal 8, and then both wirings are electrically connected through the coil-shaped cable member 3.

As described previously, the stationary casing 2 is provided with the internal gear 2d. A gear 4a which may engage the internal gear 2d is arranged on the lid body 1a. The gear 4a is so constructed that gear teeth are formed on one peripheral portion of a ring-shaped gear member 4 having an L-shaped section shown in FIG. 3. The ring-shaped gear member 4 is laid on the peripheral portion 1g of the lid body 1a which becomes, as described previously, lower than the other in order for the gear 4a thereof to confront the internal gear 2d. Further, the ring-shaped gear member 4 is so sized that the peripheral portion 1g of the lid body 1a may be covered by the other portion of the ring-shaped gear member 4, the other portion extending inwardly, when the ring-shaped gear member 4 is laid there, resulting in that a front surface of the case assembly 10 seems flat except for a part of the projections 1e, 7a. Still further, the gear 4a of the ring-shaped gear member 4 is so designed that the number of gear teeth of the gear 4a is less than that of the internal gear 2d. In addition, the ring-shaped gear member 4 is urged to the internal gear 2d by bias means which comprises a pressing ball 5 supported by a cylindrical boss 1h therein and a coil spring 5a disposed therein, the boss 1h being arranged at the pheripheral portion 1g of the lid body 1a so as to protrude outward in the radial direction of the lid body 1a. Thus, the pressing ball 5 always presses the ring-shaped gear member 4 at its peripheral inside surface, whereby the gear 4a may engage the internal gear 2d.

Figure 3:
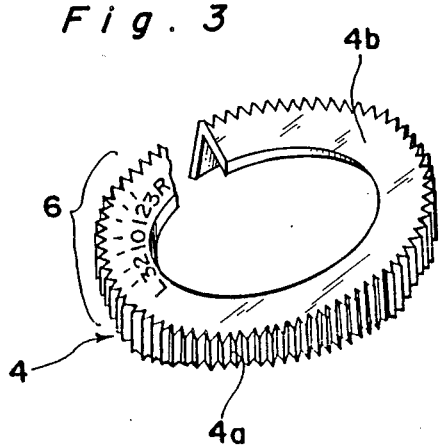
FIG. 3 is a perspective view of a ring-shaped gear member shown in FIG. 1.

As shown in FIG. 3, the ring-shaped gear member 4 has a scale 6 as a position indicator, which is provided on the front surface 4b of the other portion. This scale 6 represents a number of turns of the steering wheel. In this connection, a mating mark 9 which corresponds to a zero point on the scale 6 is provided, at least, on either of the stationary casing 2 or the rotor member 1.

According to the construction described above, when the steering wheel 11 is turned, the rotor member 1 is turned through the pin member 1e, accordingly. When the rotor member 1 turns, the pressing ball 5 moves slidably on the peripheral inside surface of the ring-shaped gear member 4 while being urged outward in the radial direction of the lid body 1a. At the same time, the ring-shaped gear member 4 is urged in the same direction by the pressing ball 5. Therefore, when the rotor member 1 turns one time, the ring-shaped gear member 4 is made to shift in the circumferential direction and its shifting amount is equivalent to the difference in the number of gear teeth between the internal gear 2d and the gear 4a of the ring-shaped gear member 4. On the other hand, the ring-shaped gear member 4 is provided with the scale 6, and one of either the stationary casing 2 and the rotor member 1 is provided with the mating mark 9. Accordingly, if the scale 6 is graduated on the front surface 4b of the ring-shaped gear member 4 so that one degree of the scale 6 may be equivalent to the shifting amount of the ring-shaped gear member 4 per a turn of the steering wheel 11, and assembling and mounting of the apparatus have been made correctly at its initial stage, a pair of the above-mentioned marks 6, 9 gives the information in which direction the steering wheel 11 has been turned and gives the information of how many turns from the neutral position of the coil-shaped cable member 3 the steering wheel 11 has been turned. Of course, the zero point of the scale 6 must be made to correspond to the neutral state of the coil-shaped cable member 3 during assembling of the ring-shaped gear member 4.

As it is apparent from the above description the electrical connecting apparatus according to the present invention is capable of indicating quantitatively the coil-shaped cable member 3 whose whole shape changes in response to the turning of steering wheel 11. Therefore, it is possible to find out the neutral position of the coil-shaped cable member in the case assembly 10 from the outside of the case 10 easily as well as accurately, so that mis-alignment between the steering system and the connecting apparatus on the occasion of mounting the apparatus to the automotive vehicle again may be effectively prevented, resulting in that the coil-shaped cable member 3 is free from problems such as wire breakage and interruption of the electrical connection between wires.

A second embodiment as described below is one example, of another way to determine biasing by the bias means by a different construction of the bias means. The different members and construction of the second embodiment are described, in detail, with different reference numerals from the first embodiment. As to the remaining embodiments, may be referred to the reference numerals corresponding to the first embodiment.

Figure 4:
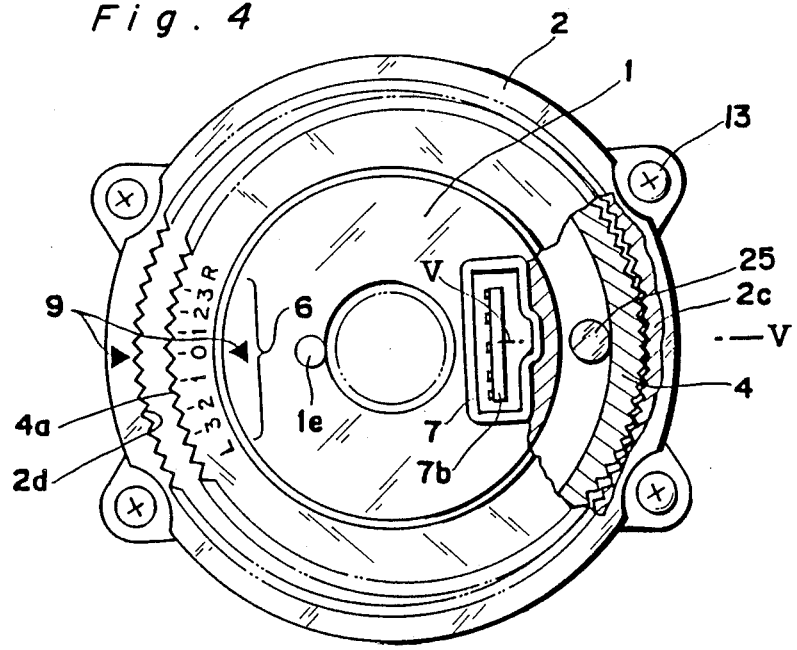
FIG. 4 is a front elevational view, partly in cross-section, of an apparatus according to a second embodiment which is applicable to the present invention.
Figure 5:
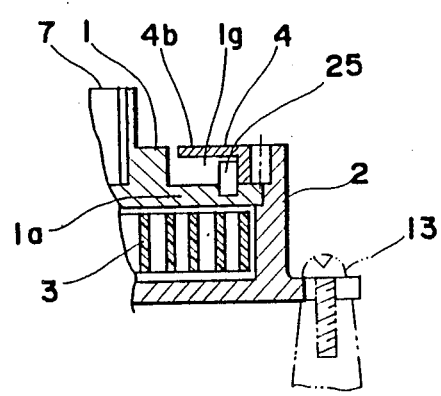
FIG. 5 is a sectional view taken along line V—V of FIG. 4.

Referring now to FIG. 4, there is shown another apparatus for connecting wiring on the side of the steering wheel to wiring on the side of the steering column. In FIG. 4, reference numeral 25 designates a pin member which is provided for a peripheral portion 1g of a lid body 1a, shown in FIG. 5, of a rotor member 1. This pin member 25 is located on a line which is drawn between two points, one being a center of an engaging portion of a gear 4a of the ring-shaped gear member 4 and an internal gear 2d of a stationary casing 2, and the other being a rotational center of the rotor member 1. Furthermore, under the engaging state of both gears 2d, 4a the above-mentioned pin member 25 is so arranged that an outer surface of the pin member 25 may come in contact with a peripheral inside surface of the ring-shaped gear member 4, as shown in FIG. 5. In this connection, the ring-shaped gear member 4 is completely the same as that of the first embodiment. Thus, the above-mentioned inside surface represents a surface behind the gear 4a. If the rotor member 1 turns, the pin member 25 can always slide on the peripheral inside surface of the ring-shaped gear member 4 while making. The gear 4a engage with the internal gear 2d a single tooth at a time Accordingly, when the pin member 25 makes one complete turn, the ring-shaped gear member 4 moves along the circumferential direction by an amount equivalent to the difference in the number of gear teeth between both gears 2d, 4a as described previously in the first embodiment.

Although the second embodiment has the pin member 25 as the bias means, the pin member 25 can be displaced by another element. For example, one modification of the second embodiment may be discribed as follows.

At the same position as the above, there is provided a projection projecting uprightly as one body with the lid body 1a. This projection is so formed that its outer surface may come in contact with the inside surface of the ring-shaped gear member 4. In this connection, preferably, its outer surface is formed with a curved face. This modification gives the same advantage with a simple structure.

Another embodiment has a pin member as the bias means and, further, a member which prevents a ring-shaped gear member from floating due to external forces. In this embodiment, the structure of an apparatus for connecting both wirings as previously described is essentially the same as that of the first embodiment. Therefore, different members are designated by different reference numerals, and the identical members, may be referred by the reference numbers found in the first embodiment.

Figure 6:
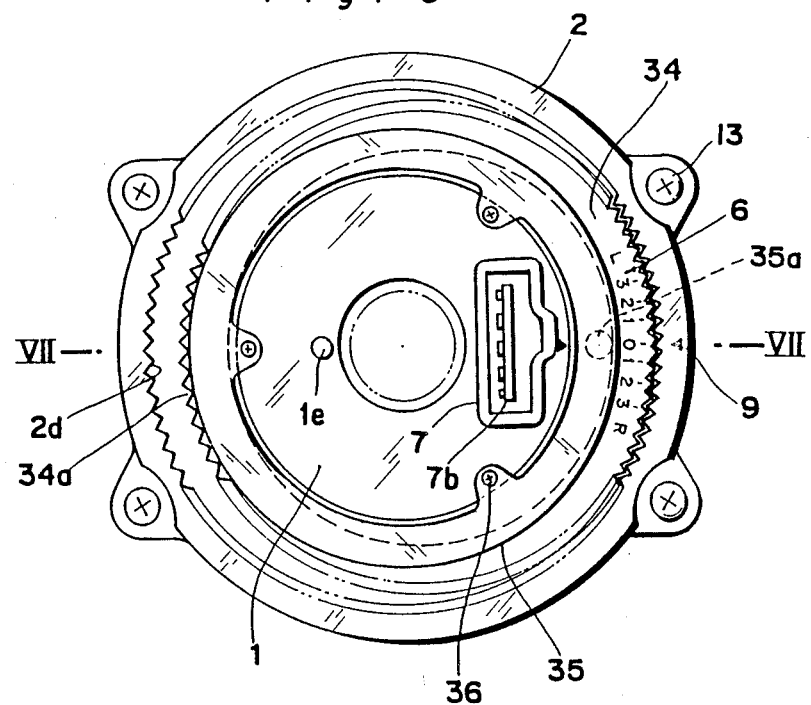
FIG. 6 is a front elevational view, partly in cross section, of an apparatus according to a third embodiment which is applicable to the present invention.
Figure 7:
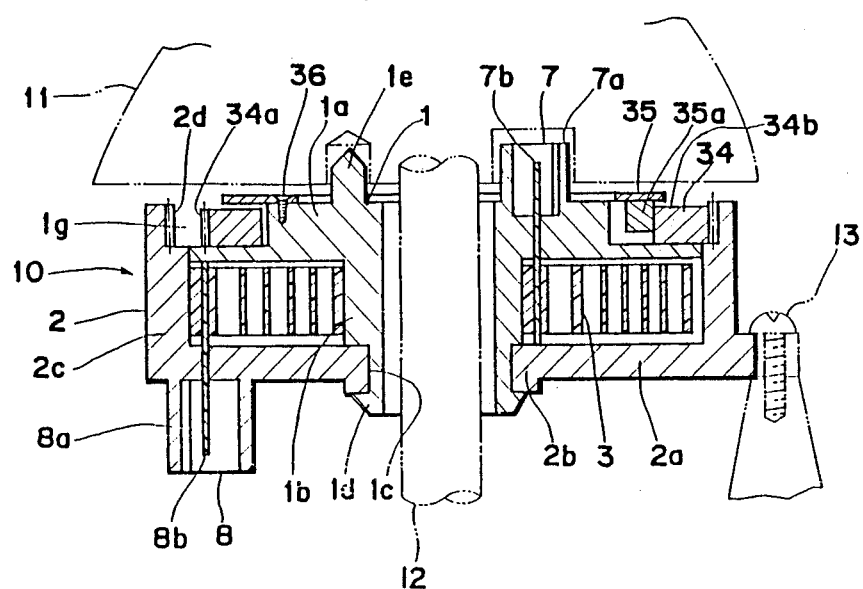
FIG. 7 is a sectional view taken along line VII—VII of FIG. 6.

Referring now to FIGS. 6 and 7, there are, respectively, shown an electrical connecting apparatus, according to a third embodiment of the present invention. In FIGS. 6 and 7, a reference numeral 34 designates a ring-shaped gear member 34 having a plurality of teeth of a gear 34a formed in its outer peripheral portion. This ring-shaped gear member 34 is disposed in a peripheral portion 1g of a lid body 1a of a rotor member 1, which is formed so as to become lower than the others of the lid body 1a. The ring-shaped gear member 34 is movable against the rotor member 1 and a stationary casing 2. The stationary casing 2 has an internal gear 2d, which is capable of being engaged with the gear 34a of the ring-shaped gear member 34, at its upper section similar to that of the first embodiment. Further, the above-mentioned gears 2d, 34a are so designed that the number of gear teeth of both gears 2d, 34a are different from each other. That is, the number of gear teeth of the gear 34a is less than that of the internal gear 2d.

On one hand, the lid body 1a of the rotor member 1 is provided with a ring plate 35. The ring plate 35 is arranged on the front surface of the lid body 1a concentrically with the rotor member 1 and is secured with screws 36 thereon. Further, the ring plate 35 is provided with a pin member 35a which is stationarily fixed on its rear surface so as to protrude downwardly, i.e., into the peripheral portion 1g of the lid body 1a. In detail, the pin member 35a is located at the position on the rear surface which brings the pin member 35a into contact with an inside surface of the peripheral portion of the ring-shaped gear member 34 so that the pin member 35a may bias the ring-shaped gear member 34 to the internal gear 2d, resulting in that one of-gear tooth of the gear 34a engages with of gear groove of the internal gear 2d.

Still further, a scale 6 is provided on the front surface 34b of the ring-shaped gear member 34, and a mating mark 9 corresponding to the scale 6 is provided on either of the rotor member 1 or the stationary casing 2. It is to be noted that an outer diameter of the ring plate 35 is so sized that the scale 6 may be visually confirmed from the outside of the case assembly 10.

In this embodiment, when the steering wheel 11 is turned, the rotor member 1 is turned through a pin member 1e. Accordingly, the ring plate 35 turns, so that the pin member 35a on the ring plate 35 may slide on and move along the inside surface of the peripheral portion of the ring-shaped gear member 34. On the other hand, the ring-shaped gear member 34 is free of the lid body 1a and also the number of gear teeth of the gear 34a is different from that of the internal gear 2d of the stationary casing 2, so that the relative location of the gear 34a to the internal gear 2d, or to the stationary casing 2, may shift when the pin member 35a fully turns one time. That is, the ring-shaped gear member 34 moves in the circumferential direction and the amount of its movement is equivalent to the difference in the number of gear teeth between the two.

The scale 6 is provided on the front surface 34b of the ring-shaped gear member 34 as well as the mating mark 9 with the scale 6 being provided on either of the rotor member 1 or the casing 2. Consequently, the operating condition of the steering wheel 11 can be easily confirmed by referring to by the scale 6 and the mating mark 9. Furthermore, the ring-shaped gear member 34 which is movable on the lid body 1a is partly covered by the ring plate 35, so that the ring-shaped gear member 34 may not drop out of the peripheral portion 1g of the lid body 1a.

As described previously, the basic purpose of the present invention is to utilize a phenomenon whereby an internal gear and a gear which respectively have a different number of gear teeth are engaged with each other by a bias means and one of the two gears is driven, so that a relative location between the two may shift and the shifting amount is in proportion to a difference in the number of gear teeth between the two.

Although the present invention has been fully described by way of example with reference to the accompanying drawings, it is to be noted that various changes and modifications will be apparent to those skilled in the art from this detailed description. Therefore, otherwise such changes and modifications depart from the scope of the present invention, they should be construed as included therein.

What is claimed is:

1. In the apparatus for connecting wiring on a steering wheel to wiring on a steering column for use in an automotive vehicle, which includes a case assembly having a stationary casing fixed to the steering column and a rotor member rotatably disposed in said casing, said rotor member being rotatable together with the steering wheel, and a coil-shaped cable member accommodated in a space formed between said casings and said rotor member of said case assembly, wherein said cable member is made of a flexible material and is coiled to follow the movement of the steering wheel, one end of said cable member being fitted to said casing and the other end fitted to said rotor member, respectively, the improvement comprising:

an internal gear fixed to said casing concentrically with said rotor member;

a ring-shaped gear member having a plurality of gear teeth on its outer periphery, the number of teeth being at least one tooth less than that of said internal gear and which are engaged with said internal gear, said ring-shaped gear member being movably arranged inside said internal gear and free from said casing and said rotor member;

bias means for biasing said ring-shaped gear member against said internal gear so that said gear member may engage said internal gear, said bias means being fitted to said rotor member; and indication means arranged on a surface of said ring-shaped gear member for cooperating with a mating mark which is provided for on at least one of said casing and said rotor member.

2. An apparatus as claimed in claim 1, wherein said bias means comprises a contact segment which is movably supported in said rotor member so as to move along a radial direction of said rotor member and a spring member for urging said contact segment so that said contact segment may be in contact with a peripheral surface of the inside of said ring-shaped gear member.

3. An apparatus as claimed in claim 1, wherein said bias means comprise a pin member fixed on a front surface of said rotor member so that said pin member is in contact with a peripheral surface of the inside of said ring-shaped gear member.

4. An apparatus as claimed in claim 3, wherein said pin member is an upright projection member formed as one body with said rotor member.

5. An apparatus as claimed in claim 1, wherein said bias means comprises a ring-shaped plate stationarily arranged on said rotor member and a pin member arranged on a rear surface of said ring-shaped plate so that said pin member is in contact with a peripheral surface of the inside of said ring-shaped gear member.

* * * * *